Feb. 12, 1946.  J. W. AYERS  2,394,579

PROCESS FOR THE PRODUCTION OF IRON OXIDE

Filed June 8, 1939  2 Sheets-Sheet 1

INVENTOR
JOSEPH W. AYERS
BY Hammond & Littell
ATTORNEYS

Feb. 12, 1946.  J. W. AYERS  2,394,579
PROCESS FOR THE PRODUCTION OF IRON OXIDE
Filed June 8, 1939   2 Sheets-Sheet 2
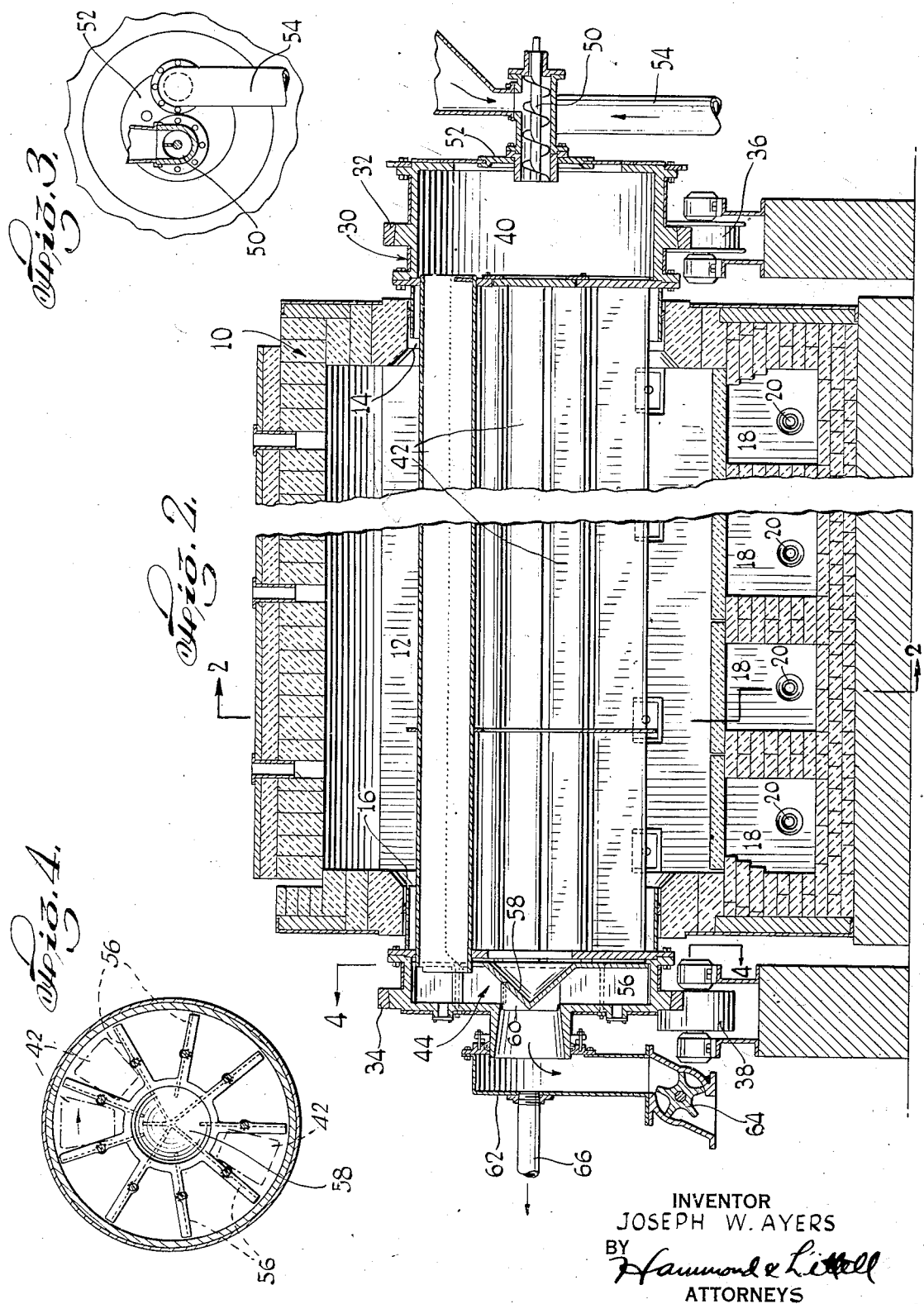
INVENTOR
JOSEPH W. AYERS
BY
Hammond & Littell
ATTORNEYS Patented Feb. 12, 1946

2,394,579

UNITED STATES PATENT OFFICE 2,394,579

PROCESS FOR THE PRODUCTION OF IRON OXIDE

Joseph W. Ayers, Easton, Pa., assignor to C. K. Williams & Co., a corporation of Pennsylvania Application June 8, 1939, Serial No. 278,028

5 Claims. (Cl. 23—200)

This invention relates to a new and improved process for producing red iron oxide and particularly to a new cyclical process for producing red iron oxide from ferrous sulfate.

Pure red iron oxide is one of the principal colored pigments used by the paint, rubber, linoleum and similar industries.

The process generally employed for the manufacture of iron oxide pigments involves the calcination or thermal decomposition of ferrous sulfate in a large rotary kiln. The usual kiln is a large, inclined, cylindrical tube lined with refractory material. The size of the kiln varies from 50 to 100 feet in length and from 5 to 10 feet in diameter. Ferrous sulfate is charged into the elevated end of the kiln and passes by gravity through the entire tube during rotation, to be discharged at the lower end. A firebox is located adjacent the lower end of the kiln, and heat and gases from the combustion of coal, coke, gas or oil in this firebox sweep through the kiln in contact with the ferrous sulfate and exit through a flue at the upper end of the kiln.

The ferrous sulfate crystals to be used in the production of iron oxide are sometimes obtained from scrap iron by a series of treatments that results in $FeSO_4.H_2O$ as the end product. The iron is dissolved in a dilute sulfuric acid solution. The solution is then crystallized to form $$FeSO_4.7H_2O$$

which may be separated from the mother liquor in a centrifuge. The wet $FeSO_4.7H_2O$ crystals are dried and then dehydrated to obtain $$FeSO_4.H_2O$$

in a condition suitable for the decomposition process.

The calcination or decomposition of the ferrous sulfate in the rotary kiln involves treatment of the material under indefinite conditions as to temperature and in the presence of an atmosphere consisting of combustion gases and an indeterminate amount of air. In order to secure sufficiently high temperature in the upper or inlet end of the kiln, the lower or exit end must often be overheated. In practice decomposition is allowed to proceed until most of the ferrous sulfate has been converted to ferric oxide, which may take place, at least partially, according to the reactions:

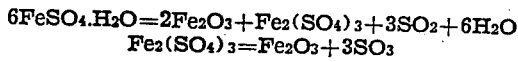

The calcined material issuing from the lower end of the kiln is washed to remove soluble impurities, whereupon substantially pure red iron oxide suitable for use as a color pigment may be obtained. The decomposition gases exhausted from the upper end of the kiln consist of combustion gases, water vapor and a very small concentration of sulfur oxides. These gases are generally wasted in the air.

This common process for producing red iron oxide has a number of defects and shortcomings that have not been overcome prior to my invention. When treating the usual ferrous sulfate, which contains from .15 to .50% of manganese sulfate as an impurity, it is impossible to obtain a high percent conversion of ferrous sulfate to ferric oxide while securing iron oxide sufficiently free of manganese oxide to be of satisfactory pigment quality with respect to manganese oxide content and color properties. When producing valuable iron oxide pigments with low manganese oxide content the yields do not exceed about 70%. Also, it is difficult to vary the color properties of the product accurately; and the efficiency of the process with regard to heat consumption, apparatus and material requirements, etc., is objectionably low.

A new and improved process overcoming these and other shortcomings of the conventional process is disclosed and claimed in my copending application, Serial No. 278,027, filed of even date herewith.

Another objectionable feature of the conventional process for producing red iron oxide resides in the lack of efficient utilization of process materials and by-products. The decomposition gases from the calcination kiln, for example, are of such nature that recovery of their valuable constituents is economically impracticable, so that these gases are usually entirely wasted. This not only involves an economic loss, but it also frequently results in contamination of the air in the neighborhood of the place where the process is being operated. Yet it would entail excessive costs to operate the process with special provision for preventing the release of the kiln gases into the air.

It is therefore an object of the present invention to provide a new and improved cyclical process for producing red iron oxide which results in efficient production and utilization of materials and gases in the operation of the process.

Another object of this invention is to provide a process for producing red iron oxide by which the release of decomposition gases into the air and the consequent contamination of the air are avoided, and in an economical and practical manner.

A further object of the invention is to provide such a process which at the same time overcomes the above mentioned defects and shortcomings of the conventional process for producing red iron oxide, giving a high conversion yield of iron oxide of high quality and low manganese oxide content, enabling ready control over and variation of color properties of the iron oxide, and resulting in materially increased efficiency of process operations.

One of the features of the present invention consists in carrying out the decomposition of ferrous sulfate, in the production of red iron oxide, under closely controlled temperature conditions and in supplying to the decomposing material a regulated stream of air or other gas in an amount sufficient to obtain the desired quality and yield of iron oxide while restricting the supply of air or other gas so that the decomposition gases include, comparatively, a very high concentration of sulfur oxides. The decomposition gases are then treated economically to convert sulfur oxide contained in them into sulfuric acid, which may be circulated advantageously to a starting point in the process and used in the production of ferrous sulfate from scrap iron or the like.

Another important feature of the present invention resides in carrying out the decomposition of the ferrous sulfate in such manner as to obtain a relatively high percentage of sulfur trioxide in the sulfur oxides present in the decomposition gases. This is accomplished in part by supplying air or other oxygen containing gas in an amount sufficient to support decomposition of the ferrous sulfate according to the reaction:

$$2FeSO_4 \cdot H_2O + \tfrac{1}{2}O_2 = Fe_2O_3 + 2SO_3 + 2H_2O$$

which results in the liberation from the decomposing material of gases the sulfur oxide content of which is substantially all sulfur tri-oxide.

The sulfur tri-oxide generated according to this reaction is preserved to a large extent, notwithstanding the strong tendency of sulfur tri-oxide to decompose into sulfur dioxide and oxygen at the temperatures encountered in the process, by maintaining appropriate control over the maximum heating temperatures in the zone where conversion of ferrous sulfate is taking place, and by hastening the flow of the decomposition gases from this hot zone.

According to the present process, I may produce decomposition gases containing more than 10% of sulfur oxide, in which more than 50% of the sulfur oxide content consists of sulfur tri-oxide. These gases are conveniently and economically flowed through a system for the recovery of their sulfur values, in which the sulfur tri-oxide may be converted to sulfuric acid by absorption in water and in which the remaining sulfur dioxide may be converted to sulfuric acid by the well known contact or catalytic process. The sulfuric acid recovered from the gases may then be passed to the starting point of the process and used for the digestion of iron to produce ferrous sulfate. The gases remaining after extraction of sulfur oxides may be released into the air without danger of contaminating the surrounding atmosphere.

The preferred embodiment of the invention is a cyclical process for the production of red iron oxide which results in maximum utilization of process materials and by-products, eliminates the economic loss and the atmospheric contamination caused by the release of decomposition gases according to the prior process, and at the same time results in economies, improvements in product quality and yield and savings that are not obtainable from the prior process.

Other features and advantages of the invention will appear from the following detailed description of a preferred embodiment when considered in connection with the accompanying drawings, in which:

Figure 2 is a vertical longitudinal section through one form of rotary muffle which may be employed in carrying out the calcination or decomposition of the ferrous sulfate;

Figure 3 is a fragmentary end view of the muffle, viewed from the right hand end of Figure 2; and Figure 4 is a vertical cross section through the muffle, approximately along the line 4—4 of Figure 2.

Figure 1:
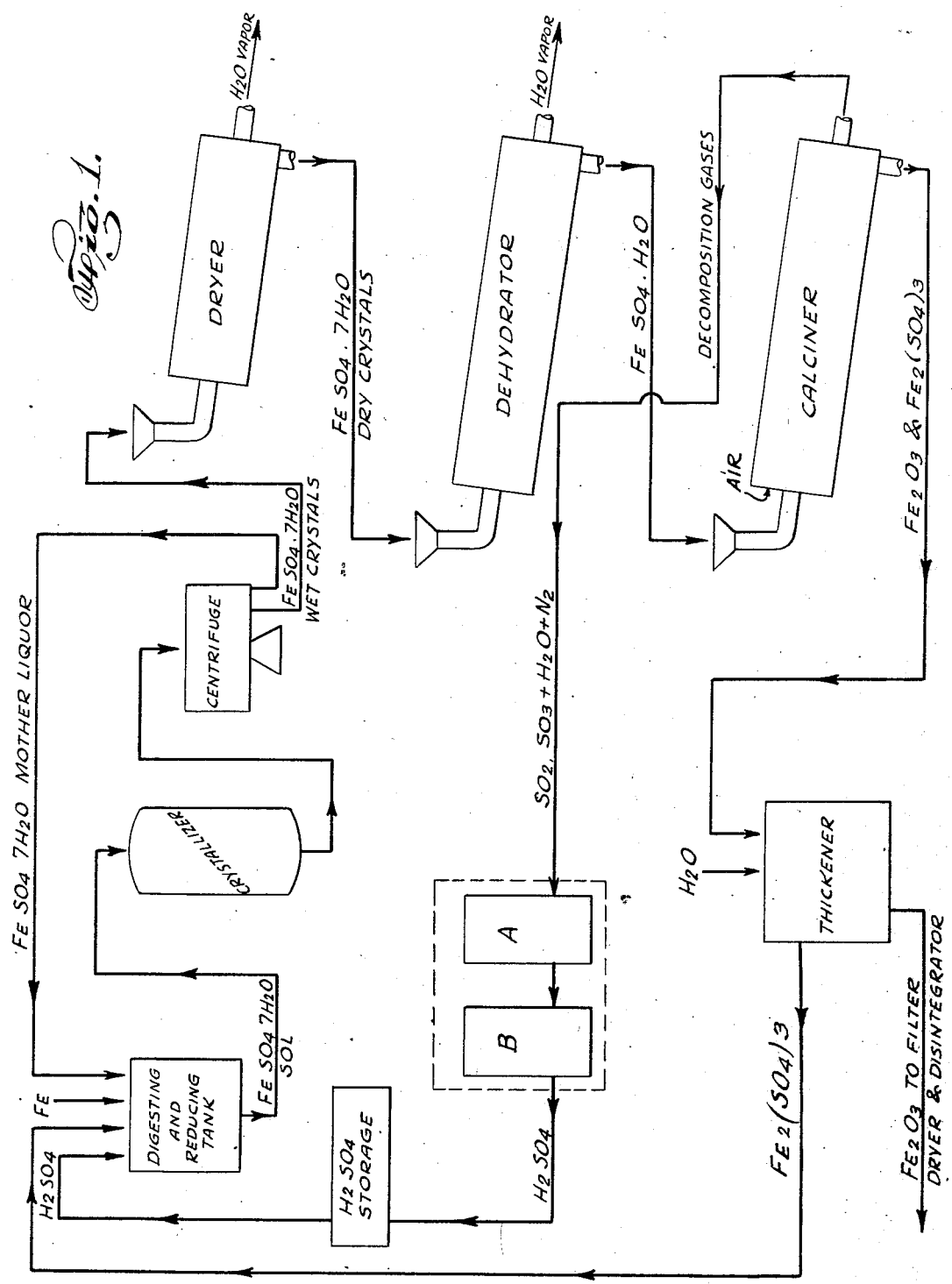
Figure 1 is a diagrammatic flow chart indicating the paths of flow and the treatment of materials in the practice of the process.

Referring particularly to Figure 1 of the drawings for illustrative details of a preferred embodiment, scrap iron or other suitable iron material is introduced into a digesting tank containing dilute sulfuric acid, and the iron is digested and dissolved in the acid to form a solution of $FeSO_4 \cdot 7H_2O$. This solution is passed into a crystallizer where the hydrated ferrous sulfate is crystallized. The resulting mixture of crystals and mother liquor is separated, for example, in a centrifuge, the mother liquor being recirculated to the digesting tank, as indicated in Figure 1, so that none of its ferrous sulfate content is lost from the process. The wet $FeSO_4 \cdot 7H_2O$ crystals are passed through a drier for the removal of water and then through a dehydrator where water of crystallization is extracted, in a well known manner, to produce $FeSO_4 \cdot H_2O$ in a condition suitable for conversion to ferric oxide.

The ferrous sulfate from the dehydrator is then passed into the calciner to be converted into iron oxide. If desired, it may be coated or mixed with a small amount of an oxidation-retarding catalyst, such as an inorganic alkali metal salt, the most common and inexpensive of which is sodium chloride, before being subjected to the decomposition treatment.

The calcination may be of any closed roaster type or form capable of effecting the requisite treatment. For purposes of illustration, I have shown in Figures 2, 3 and 4 a type of apparatus which is particularly well suited for this purpose.

The apparatus as shown in these figures comprises a furnace or firebox 10, of fire-brick or other suitable refractory material, which provides an elongated heating chamber 12 through which extends a rotary muffle 30 for carrying out the decomposition of the ferrous sulfate. Opposite end portions of the muffle 30 project through and beyond oppositely disposed openings 14 and 16 in the furnace walls. A plurality of combustion chambers 18 are located in the lower portion of the furnace, and the muffle is heated to controlled decomposition temperatures by the combustion of suitable fuel from burners 20, which extend into the combustion chambers 18.

The entire muffle is mounted for rotation at a suitable speed, for example, by means of tires 32 and 34 secured to the muffle wall and cooperating rollers 36 and 38. Its axis of rotation is slightly inclined so that material introduced into the muffle at its upper end gradually progresses to the lower end during rotation.

In order that the composition of gases supplied to and exhausted from the muffle may be controlled, the muffle is made substantially gas-tight, while providing suitable means for feeding and discharging solid materials and for introducing and drawing off gases.

As illustrated, the main body of the muffle comprises a charge header 40 at its upper end, a multiplicity of elongated tubes 42 extending through furnace chamber 12 and all communicating with the charge header, and a common discharge header 44 communicating with the outlet ends of tubes 42 and having means therein for the discharge of solid materials from the muffle during rotation.

The ferrous sulfate may be fed into the charge header 40 by suitable feeding means, for example, an axially disposed screw conveyor 50 opening into header 40 through a port in a stationary end wall section 52. Air or other gas may be introduced into header 40 by means of a supply pipe 54 communicating with a second port in wall section 52.

The ferrous sulfate accumulated in charge header 40 is picked up in the inlet ends of the several muffle tubes 42 during rotation of the muffle, and the material continuously progresses lengthwise of the tubes, and through the reaction zone maintained therein by heat from the furnace, until it is finally discharged from tubes 42 into header 44. The calcined material entering the discharge header is lifted and dropped toward the axis of the muffle by radial vanes 56 which rotate with the muffle. An axially disposed discharge cone 58 directs the material through a discharge opening 60 and thence into a stationary hood 62 that is arranged in substantially gas-tight relation to the muffle. From the hood 62 the material may be withdrawn as desired by means of sealed discharging means, such as a rotary star wheel 64. Decomposition gases exhausted from the muffle may be drawn off through an exit pipe 66 connected with hood 62.

The multiplicity of muffle tubes 42, as illustrated, are arranged in parallel and circularly spaced relation around the axis of rotation of the muffle, at substantially equal radii from the axis. For best results, each tube may be quadrilateral in cross section, as indicated, for example, in Figure 4. With such a construction, the material passing through the tubes is continually turned over and over during its progression from the charge header to the discharge header, and the transfer of heat to the material while in the decomposition zone takes place at maximum efficiency. For effectiveness of heat transfer the muffle tubes are preferably made entirely of sheet metal, and high strength and corrosion resistance are obtained by making the muffle tubes, as well as other parts of the muffle that are subject to contact with materials and gases at high temperatures, from strong, corrosive-resistant, creep-resistant metals such as the high chromium irons and steels alloyed in smaller percentages with metals such as nickel, tungsten, manganese and molybdenum.

In the practice of the present process, the heating temperatures for the material in the muffle tubes are kept at closely regulated points between about 1300 to 1550° F. The particular temperature will depend upon the desired color and manganese oxide content of the final iron oxide product and on the desired rate of conversion of the ferrous sulfate to iron oxide. The ferrous sulfate from the dehydrator is fed into the discharge header 40 at a regulated rate, from which it passes through the muffle tubes 42 in substantially uniform, evenly distributed streams. At the same time, air or other oxygen-containing gas is introduced into header 40 and into the muffle tubes from supply pipe 54. The supply of gas is regulated to provide an amount of oxygen sufficient to support decomposition and conversion of the ferrous sulfate to ferric oxide according to the reaction:

$$2FeSO_4 + \tfrac{1}{2}O_2 = Fe_2O_3 + 2SO_3 + 2H_2O$$

This gas supply, however, is restricted so that the decomposition gases exhausted from the heating zone of the muffle and drawn off through pipe 66 contain a comparatively high concentration, usually about 12 to 15%, of sulfur oxides.

By virtue of the highly efficient transfer of heat to the ferrous sulfate in the muffle tubes, the maximum temperatures to which materials and gases in the tubes are subjected in the course of the treatment are kept at the lowest possible point for the production of each particular grade of iron oxide. Furthermore, the rate of flow of gases through the heating zone of the muffle is enhanced, and the lingering of sulfur tri-oxide at temperatures favorable to the production of sulfur dioxide is prevented to the maximum extent consistent with other requirements of the process, by providing little void space for the passage of gases through the conversion zone of the muffle. In this manner I produce from the calcination stage of the process decomposition gases in which more than 50%, and usually about 60%, of the sulfur oxide content of the gases consists of sulfur tri-oxide. At the same time, conversion of the ferrous sulfate into red iron oxide of high quality is carried out to give extraordinarily high yields, of between 85 and 92%, or more, with a manganese oxide content below .05%.

Referring again to the flow chart in Figure 1 of the drawings, the decomposition gases from the calcination apparatus are passed through a system for the production of sulfuric acid, which may include a unit of well known type, indicated at A, for the conversion of sulfur tri-oxide into sulfuric acid by absorption and another unit of well known type, indicated at B, for the conversion of sulfur dioxide into sulfuric acid by the contact or catalytic process. When sulfur tri-oxide exceeds 50% of the sulfur oxide content of the gases, as in the preferred practice of the invention, it may be desirable in some cases to convert only the sulfur tri-oxide into sulfuric acid, provided that it is satisfactory to release the remaining gases into the air.

The sulfuric acid obtained in this recovery system is passed into the digesting tank at the head of the process, either directly or after storage, where it is used for digesting the incoming iron.

The calcined material discharged from the calcination apparatus consists principally of ferric oxide with a small percentage of ferric sulfate. This material is passed to the thickener where it is washed with water to dissolve soluble sulfate and where the residual insoluble ferric oxide is partially separated from the resulting solution. The ferric sulfate solution, as indicated in Figure 1, may then be flowed to the digesting tank to be reduced to ferrous sulfate by the iron there present, and then to be recirculated through the process. Ferric oxide separated at the thickener is filtered, dried and disintegrated, giving red iron oxide having valuable qualities for use as a color pigment, in paints, rubber, linoleum and the like.

For purposes of clarity and illustration I have described numerous details of a preferred embodiment of the present invention and have described and illustrated details of construction of a form of apparatus which is particularly suitable for use in practicing the invention. It will be understood, however, that various features of the process may be modified or avoided without sacrificing contributions of the invention and that the process claimed herein may be practiced with various types of apparatus. I therefore desire that the invention be accorded a scope fully commensurate with its novel teachings as limited only by the fair requirements of the appended claims.

I claim:

1. In a process for producing red iron oxide, the steps which comprise heating ferrous sulfate out of direct contact with flame or combustion gases in a substantially closed heating zone to temperatures between 1300 and 1550° F. to cause conversion of ferrous sulfate into iron oxide of a predetermined quality, supplying air to the decomposing material in an amount sufficient to support the reaction $$2FeSO_4 \cdot H_2O + \tfrac{1}{2}O_2 = Fe_2O_3 + 2SO_3 + 2H_2O$$

restricting the supply of air so that the gases exhausted from the heating zone contain at least 10% of sulfur oxides, and limiting the time of contact of such gases with decomposing conditions in the heating zone such that the gases have at least 50% of the sulfur tri-oxide in said sulfur oxide content.

2. In a process for producing red iron oxide, the steps which comprise heating ferrous sulfate indirectly in a substantially closed heating zone to a temperature between 1300 and 1550° F. to cause conversion of ferrous sulfate into iron oxide, supplying air to the decomposing material in an amount sufficient to support the reaction $$2FeSO_4 \cdot H_2O + \tfrac{1}{2}O_2 = Fe_2O_3 + 2SO_3 + 2H_2O$$

restricting the supply of air so that the gases exhausted from the heating zone contain at least 10% of sulfur oxides, limiting the time of contact of such gases with decomposing conditions in the heating zone such that the gases have at least 50% of sulfur tri-oxide in said sulfur oxide content and converting sulfur oxide from said gases into sulfuric acid.

3. In a process for producing red iron oxide, the steps which comprise passing ferrous sulfate continuously through a substantially closed heating zone heated externally to temperatures between 1300 and 1550° F. to cause conversion of ferrous sulfate into iron oxide of predetermined quality, supplying air to the decomposing material in an amount sufficient to support the reaction $$2FeSO_4 \cdot H_2O + \tfrac{1}{2}O_2 = Fe_2O_3 + 2SO_3 + 2H_2O$$

restricting the supply of air so that the gases exhausted from the heating zone contain at least 10% of sulfur oxides, limiting the time of contact of such gases with decomposing conditions in the heating zone by restricting the volume of gases held in said zone so that the exhausted gases have at least 50% of sulfur tri-oxide in said sulfur oxide content and converting sulfur oxide from said exhausted gases into sulfuric acid.

4. A cyclical process for producing red iron oxide which comprises dissolving iron in dilute sulfuric acid, crystallizing and separating $FeSO_4 \cdot 7H_2O$ from the solution, drying and dehydrating the $FeSO_4 \cdot 7H_2O$ to obtain $FeSO_4 \cdot H_2O$, decomposing the $FeSO_4 \cdot H_2O$ by heating the same indirectly in a substantially closed heating zone to a temperature between 1300 and 1550° F. while supplying air in an amount at least sufficient to support decomposition according to the reaction $$2FeSO_4 \cdot H_2O + \tfrac{1}{2}O_2 \rightarrow Fe_2O_3 + 2SO_3 + 2H_2O$$

restricting the supply of air to the decomposing material so as to have at least 10% of sulfur oxides in the decomposition gases, fixing conditions such that the decomposition gases taken off from said zone have at least 50% of sulfur tri-oxide in said sulfur oxides, converting sulfur tri-oxide, from the decomposition gases, into sulfuric acid, and dissolving iron in the resulting sulfuric acid as aforesaid.

5. A cyclical process for producing iron oxide which comprises dissolving iron in dilute sulfuric acid in a tank, crystallizing and separating $FeSO_4 \cdot 7H_2O$ from the solution, returning the $FeSO_4 \cdot 7H_2O$ mother liquor into said tank, drying and dehydrating the $FeSO_4 \cdot 7H_2O$ to obtain $FeSO_4 \cdot H_2O$, producing decomposition gases containing at least 10% of sulfur oxide and calcined material consisting essentially of ferric oxide and ferric sulfate by heating indirectly and decomposing the $FeSO_4 \cdot H_2O$ out of contact with flame or combustion gases, in an externally heated muffle, while supplying a restricted amount of oxygen-containing gas to the decomposing material, fixing the conditions of decomposition such that at least half of the sulfur oxide content of said gases is sulfur tri-oxide, converting sulfur oxide from said decomposition gases into sulfuric acid, flowing the resulting sulfuric acid into said tank, washing said calcined material to obtain ferric sulfate solution and wet ferric oxide, flowing the ferric sulfate solution into said tank, and drying the ferric oxide to obtain substantially pure iron oxide.

JOSEPH W. AYERS.